Jan. 12, 1943.  O. O. NEWHOUSE  2,308,298
MILK COOLER
Filed April 18, 1940
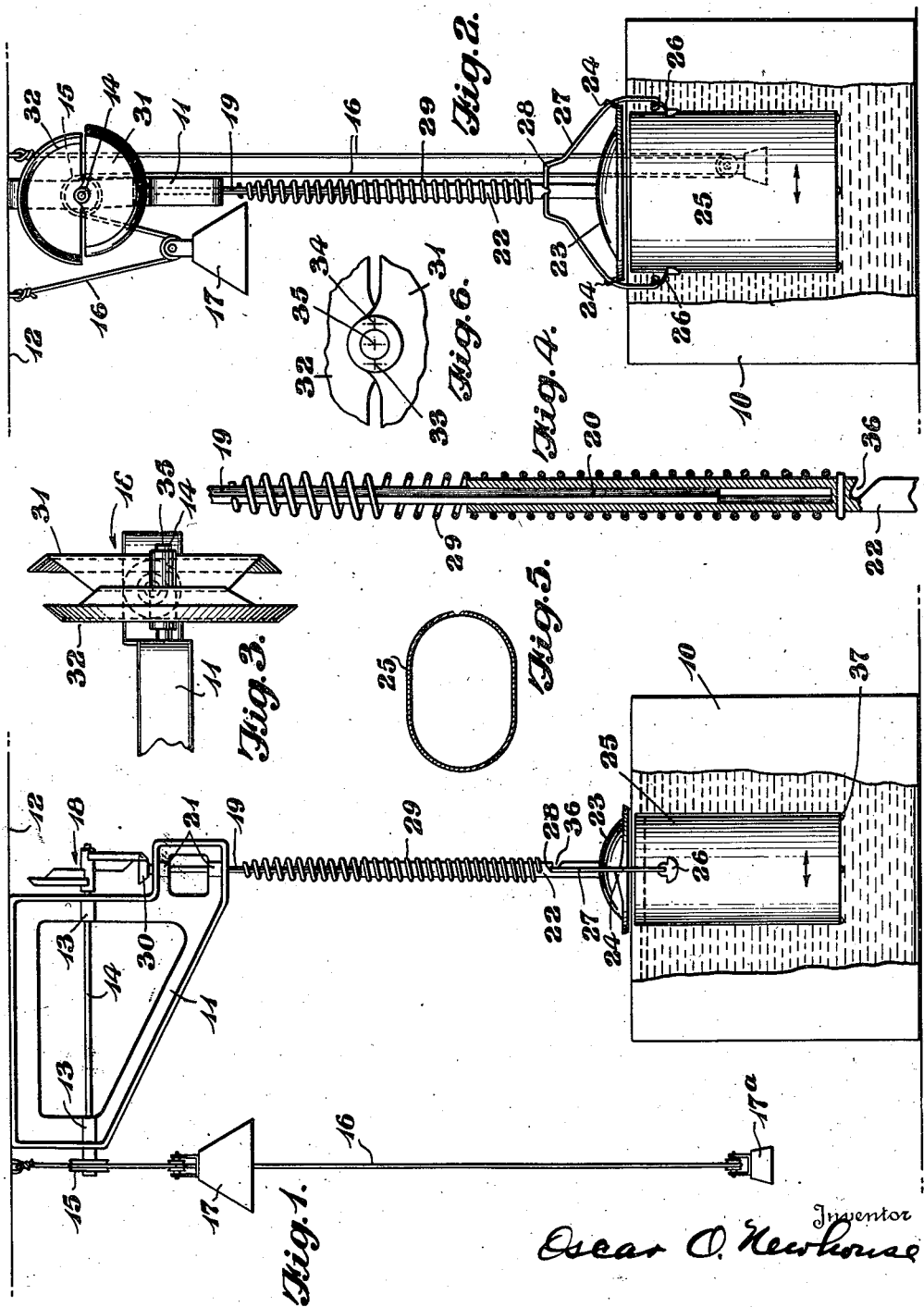

Patented Jan. 12, 1943

2,308,298

UNITED STATES PATENT OFFICE 2,308,298

MILK COOLER

Oscar O. Newhouse, Brandon, Minn.

Application April 18, 1940, Serial No. 330,382

5 Claims. (Cl. 259—56)

This invention relates to apparatus for cooling a fluid and is particularly adapted for the cooling of milk or cream.

An object of this invention is to provide a simple, self-contained cooling apparatus requiring no external power, but may be operated by other power if desired. A further object is to provide an apparatus which will more rapidly cool the milk than heretofore, and in which there will be a better heat transfer between the milk and the cooling fluid. A further object is to provide a ready and convenient means for automatically adjusting the height of the receptacle in relation to the height of the cooling fluid in the outer container.

Other objects and the nature and advantages of the invention will be apparent from the following description taken in conjunction with the accompanying drawing, wherein:

Fig. 1 is a front elevation of the assembled device;

Fig. 2 is a side elevation of the device shown in Fig. 1;

Fig. 3 is a detailed view of the segmental pulley, showing the association of the bevel pulley and vertical shaft therewith;

Fig. 4 is a view of the shaft assembly and spring;

Fig. 5 is a horizontal cross section of the can or receptacle of Fig. 1; and

Fig. 6 is an enlarged fragmentary view of the face of the segmental pulley of Fig. 3.

Referring to Fig. 1, I provide a large tank or container 10 which is partially filled with a cold liquid, preferably water, which may or may not have ice in it. A frame 11 is fastened to the ceiling or other convenient support 12 in a position above the receptacle 10. This frame has bearings 13 through which the shaft 14 passes. On one end of the shaft 14 is provided a pulley 15, across the top of which a rope or chain 16 passes. Weights 17 and 17a cause a unidirectional rotation of pulley 15 in the well-known manner. A split or segmental pulley 18 is provided on the other end of the shaft 14 and rotated thereby. The pulley 18 will be more fully described later.

A shaft 19 having a squared lower portion 20 is journaled in bearings 21 of the frame 11 directly below the pulley 18. A shaft 22 cooperates with the shaft 19 so as to transmit torque to cover 23. The shaft 22 is a slip fit on shaft 19, and its inside contour is similar to the cross section of the lower end of shaft 19. This need not be square, but may be of any non-circular cross section. The lower end of shaft 22 is rigidly secured to the center of the plate or cover 23.

The periphery of cover 23 may be formed with an upwardly and outwardly projecting edge. Two notches 24 are cut into the cover 23 at opposite sides thereof. The edge portion of the cover on one side of each notch may be cut lower, as shown in Fig. 1, to facilitate positioning of the bail 27 therein. The bail 27 is shaped so that mid portions of its sides will lie in the notches 24, thus supporting can 25. The upper extremity 28 of the bail 27 is placed in the slot 36 located towards the lower end of the shaft 22. This slot has a downwardly extending opening which acts to force and retain lower portions of the bail 27 tightly within notches in the projections or blocks 24 which are fixed to the cover 23. The top or cover 23 is formed of a sufficient size so as to extend beyond the periphery of the can 25 in order to prevent excessive tipping of the can 25 on the bail 27 due to the buoyant effect of the cooling fluid when a small amount of liquid is placed in the can 25.

The length of the bail 27 is such as to maintain the can 25 a slight distance below the lower face of the cover 23 so as to permit aeration of the milk or cream while it is being cooled. Legs 37 may be positioned on the bottom of the can 25 in case that a can having the bottom flush with the extremity of the sides is used. If a can having a recessed bottom is used, not shown, means must be provided to release air that would normally be trapped within the recessed bottom when the can 25 is placed in the cooling fluid.

A spring 29 is positioned around the outside of shafts 19 and 22, and one end is connected to each shaft, see Fig. 4. The function of spring 29 will be discussed in connection with the action of pulley 18. The can 25 may be of any cross section, but is preferably of non-circular horizontal cross section, as shown in Fig. 5. I prefer an oval cross section.

A small bevel pulley 30 is rigidly attached to the upper extremity of shaft 19, and is frictionally rotated by the segmental pulley 18. The pulley 18, see Fig. 3, is composed of two semicircular segments of V-shaped cross section, the centers of the segments 33 and 34 being oppositely and eccentrically displaced relative to the axis 35 of the pulley 18, see Figs. 2 and 6. The axis of the shaft 19 is offset from the axis of shaft 14 an amount approximately equal to or slightly exceeding the eccentric displacement of segments 31 and 32. This displacement of shaft 19 permits the pulley 30 to turn freely and without binding as the pulley 18 revolves. Thus, it is apparent that when the shaft 14 is rotated unidirectionally, the segments 31 and 32 alternately engage opposite sides of the pulley 30 rotating the shaft 19 first in one direction for a few turns and then in the opposite direction.

Since the segments 31 and 32 of the pulley 18 are displaced eccentric to the axis of the pulley, as the pulley rotates it will impart a reciprocatory motion to pulley 30 and shaft 19 as well as an oscillatory one. The reciprocatory motion of shaft 19 will be transmitted through spring 29 and impart a gentle vertical reciprocatory movement to can 25, while the shafts 19 and 22 transmit oscillatory motion by means of the cover 23 and bail 27 to can 25.

The cooling can 25 and shaft 19 are suspended from pulley 30 which rests on the beveled inner surfaces of the segments 31 and 32, but the greater portion of the weight of the can and contents is supported by the buoyant effect of the displaced cooling liquid in the tank 10.

To compensate for varying levels of liquid in the container 10 or can 25, spring 29 may contract or expand its length so that it will always support can 25 in container 10 with the liquid level approximately the same as the liquid level in the container 10.

To operate this device, the material to be cooled is placed in can 25, and the bail 27 attached by means of the ears 26. The container 10 may be previously filled with water or other cooling fluid and the can 25 may be placed in the container 10 with the bail 27 positioned in the notches of block 24 and locked in place by engaging the upper end 28 of the bail in notch 36.

To operate this device it is necessary only to move the weight 17 up to the position shown in Fig. 1, which allows the cooperating weight 17ª to assume a position near the floor. Weight 17 imparts a rotary motion to shaft 14, while the function of weight 17ª is to provide friction between the rope or chain 16 and pulley 15. It will be seen that I have provided a simple and inexpensive means for supplying power to rotate the can 25 without the use of any external power.

Since the horizontal cross section of can 25 is non-circular, when it is rotated it will cause a constant circulation of liquid in the container 10 so as to effect a rapid transfer of heat from the liquid in can 25 to liquid in the container 10. The reciprocatory motion of can 25 also makes for more rapid cooling of the contents of the can due to the fact that this constant agitation circulates liquid in both the can 25 and the container 10.

In this device the short time required for cooling due to the extremely efficient heat transfer between the cooling fluid and the liquid to be cooled makes the use of weight driven rotation means practical.

It will be understood that changes and modifications in design and construction may be adapted within the scope of the invention as defined by the appended claims.

I claim:

1. An apparatus for tempering fluids, in combination with a tank or analogous container having therein a tempering fluid and a receptacle containing the fluid to be tempered, means resiliently suspending said receptacle in the tank, and means for imparting simultaneous oscillatory and axial reciprocatory movement to said receptacle, and to said suspending means.

2. In apparatus for tempering fluids, in combination with a tank or analogous container having therein a tempering fluid and a receptacle containing the fluid to be tempered, resilient means suspending said receptacle in the tank, and means, including an extensible shaft positioned within said resilient means, for imparting simultaneous oscillatory and reciprocatory movement to said receptacle.

3. In apparatus for tempering fluids, in combination with a tank or analogous container having therein a tempering fluid and a receptacle containing the fluid to be tempered, means resiliently suspending said receptacle in the tank, and means including a segmental pulley having the segments thereof mounted eccentric to the axis of said pulley for imparting simultaneous oscillatory and reciprocatory movement to said receptacle.

4. In apparatus for tempering fluids, in combination with a tank or analogous container having therein a tempering fluid and a receptacle of non-circular horizontal cross section containing fluid to be tempered, a cover for said receptacle, and means engaging said receptacle for suspending said receptacle in the tank and imparting rotary motion thereto, said means suspending said receptacle in spaced relation to the cover thereof, and means engaging said suspending means for maintaining said receptacle in a substantially vertical position while immersed in the tempering fluid.

5. In apparatus for tempering fluids, in combination with a tank or analogous container having therein a tempering fluid and a receptacle of non-circular horizontal cross section containing fluid to be tempered, a cover for said receptacle, and means engaging said receptacle for suspending said receptacle in the tank and imparting rotary motion thereto, said means suspending said receptacle in spaced relation to the cover thereof, and means including notches formed in said cover for engaging said suspending means and for maintaining said receptacle in a substantially vertical position while immersed in the tempering fluid, the edge of said cover being extended further on one side of said notches.

OSCAR O. NEWHOUSE.